(12) United States Patent
Liao et al.

(10) Patent No.: US 8,750,918 B2
(45) Date of Patent: Jun. 10, 2014

(54) CHANNEL SELECTION METHOD AND ELECTRONIC DEVICE THEREOF

(75) Inventors: Wen-Pin Liao, Taoyuan County (TW); Chun-Lin Kuo, Taoyuan County (TW); Sin-Jhih Li, Taoyuan County (TW); Chin-Yu Wang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 295 days.

(21) Appl. No.: 13/208,331

(22) Filed: Aug. 11, 2011

(65) Prior Publication Data

US 2012/0276944 A1 Nov. 1, 2012

(30) Foreign Application Priority Data

Apr. 29, 2011 (TW) .............................. 100115160 A

(51) Int. Cl.
*H04M 1/00* (2006.01)

(52) U.S. Cl.
USPC ..... 455/524; 455/525; 455/67.11; 455/552.1; 455/517; 455/63.1; 370/465; 370/466; 370/467; 370/401; 370/352

(58) Field of Classification Search
USPC .................. 455/524, 525, 552.1, 517, 67.11; 370/465, 466, 467, 401, 352, 356, 353, 370/354, 355
See application file for complete search history.

(56) References Cited

U.S. PATENT DOCUMENTS

| | | | |
|---|---|---|---|
| 7,146,133 B2 * | 12/2006 | Bahl et al. ..................... 455/63.1 |
| 7,551,641 B2 | 6/2009 | Pirzada et al. | |
| 2004/0203727 A1 * | 10/2004 | Abiri et al. ..................... 455/423 |
| 2004/0264394 A1 * | 12/2004 | Ginzburg et al. .............. 370/310 |
| 2005/0003796 A1 * | 1/2005 | Kashiwase ..................... 455/403 |
| 2007/0135162 A1 * | 6/2007 | Banerjea et al. ............ 455/556.1 |
| 2008/0219281 A1 * | 9/2008 | Akin et al. ..................... 370/419 |
| 2009/0262785 A1 * | 10/2009 | Wilhelmsson ................ 375/133 |
| 2010/0137025 A1 * | 6/2010 | Tal et al. ..................... 455/553.1 |
| 2010/0273426 A1 * | 10/2010 | Walley et al. ................. 455/63.1 |
| 2010/0322287 A1 * | 12/2010 | Truong et al. ................. 375/133 |
| 2011/0009136 A1 * | 1/2011 | Mantravadi et al. .......... 455/501 |
| 2011/0199890 A1 * | 8/2011 | Sadan et al. ................... 370/216 |
| 2011/0235621 A1 * | 9/2011 | Ko et al. ........................ 370/338 |
| 2011/0287795 A1 * | 11/2011 | Cahill ............................ 455/509 |
| 2011/0306367 A1 * | 12/2011 | Cahill ............................ 455/464 |
| 2012/0003939 A1 * | 1/2012 | Chen et al. .................. 455/67.11 |
| 2012/0015606 A1 * | 1/2012 | Beacham et al. ............... 455/62 |
| 2012/0164948 A1 * | 6/2012 | Narasimha et al. ........... 455/63.1 |
| 2012/0276944 A1 * | 11/2012 | Liao et al. ..................... 455/524 |
| 2013/0094522 A1 * | 4/2013 | Moshfeghi .................... 370/498 |

OTHER PUBLICATIONS

"Office Action of German Counterpart Application", issued on Jun. 25, 2013, p.1-p. 12.

* cited by examiner

*Primary Examiner* — Temesgh Ghebretinsae
*Assistant Examiner* — MD Talukder
(74) *Attorney, Agent, or Firm* — Jianq Chyun IP Office

(57) ABSTRACT

A channel selection method and electronic device thereof are provided. In the channel selection method, usable channels of a second communication protocol are selected according to a used channel number of a first communication protocol, and one of the usable channels is selected according to the numbers of wireless access points, thereby preventing or alleviating the interference between the first communication protocol and the second communication protocol.

22 Claims, 3 Drawing Sheets

CHANNEL SELECTION METHOD AND ELECTRONIC DEVICE THEREOF

CROSS-REFERENCE TO RELATED APPLICATION

This application claims the priority benefit of Taiwan application serial no. 100115160, filed Apr. 29, 2011. The entirety of the above-mentioned patent application is hereby incorporated by reference herein and made a part of this specification.

BACKGROUND OF THE INVENTION

1. Field of the Invention

The disclosure relates to a channel selection method and an electronic device thereof. Particularly, the disclosure relates to a channel selection method capable of preventing interference between two communication protocols and an electronic device thereof.

2. Description of Related Art

An era of high-bandwidth is coming, and according to an idea of "last mile" of the communication technique, internet equipment of a worldwide interoperability for microwave access (WiMAX) communication protocol is generally configured at a last segment of link of an Internet service provider (ISP). Users of various local area network systems may connect the internet equipment configured with the WiMAX communication protocol to obtain a high-bandwidth service through the internet equipment. Moreover, a hotspot communication device in the city also applies such concept, and the WiMAX communication protocol and a commonly used wireless local area network protocol, for example, a wireless fidelity (WiFi) communication protocol are simultaneously configured to the hotspot communication device, and the user can connect the hotspot communication device in the city through an electronic device having a WiFi communication protocol module, while the hotspot communication device is connected to the ISP through the WiMAX communication protocol.

However, since bands of the two communication protocols in the hotspot communication device are close to each other, mutual interference of the two communication protocols is probably occurred. For example, the WiMAX communication protocol and the WiFi communication protocol coexist in the hotspot communication device, where the WiMAX communication protocol may be operated within a band range of 2.3 GHz-2.4 GHz or 2.5 GHz-2.7 GHz, and the WiFi communication protocol is operated within a band range of 2.4 GHz-2.48 GHz. When a transceiver module in the hotspot communication device that supports the WiMAX communication protocol outputs power, it may influence quality of the signal transceived through the WiFi communication protocol in the hotspot communication device, so that a whole data throughput is reduced under such interference effect.

In order to avoid the physical phenomenon of mutual interference, a corresponding solution is to fix a usage channel of the WiFi communication protocol to a WiFi channel far away from the WiMAX operating frequency to achieve stability of data transmission under a coexistence environment of the WiMAX communication protocol and the WiFi communication protocol. However, such solution limits channel selection of the WiFi communication protocol, and the data throughput thereof is far lower than a data throughput when all of the WiFi communication channels are selectable, which is required to be ameliorated.

SUMMARY OF THE INVENTION

The disclosure proposes a channel selection method and an electronic device thereof for preventing or alleviating the interference between two communication protocols.

The disclosure provides an electronic device including a first antenna unit, a second antenna unit, a first detection unit, a second detection unit, a storage unit and a control unit. The first antenna unit supports a first communication protocol, and a band of the first communication protocol is divided into a plurality of first channels. The second antenna unit supports a second communication protocol, and a band of the second communication protocol is divided into a plurality of second channels. The first detection unit is coupled to the first antenna unit and the second antenna unit, and the first detection unit measures a throughput of each of the second channels when each of the first channels is used. The second detection unit is coupled to the second antenna unit for detecting the number of wireless access points on each of the second channels. The storage unit is coupled to the first detection unit and the second detection unit for providing a storage space to store the throughput of each of the second channels obtained when each of the first channels is used and the number of the wireless access points. The control unit is coupled to the storage unit for selecting the second channel simultaneously used together with the currently used first channel from the second channels according to the throughput and the number of the wireless access points.

In an embodiment of the disclosure, the control unit uses the first antenna unit to obtain a currently used first channel number, and determines at least one usable channel in the second channels according to the first channel number, where an interference degree between the usable channel and the first channel may allow the throughput of the usable cannel to be greater than or equal to a stable transmission rate when the usable channel and the first channel are simultaneously used, and the control unit selects one of the usable channels to use together with the currently used first channel according to the number of the competitive wireless access points in each of the usable channels.

In an embodiment of the disclosure, the stable transmission rate is a minimum data transmission rate specified by the second communication protocol.

In an embodiment of the disclosure, the control unit establishes a look-up table according to each of the first channel numbers and the throughput of each of the second channels obtained when each of the first channels is used, where the look-up table records each of the second channels that is capable of being used together with the first channel when the first channel corresponding to each of the first channel numbers is used, and the control unit stores the look-up table in the storage unit, and looks up the look-up table to obtain the usable channel from the second channels according to the first channel number.

In an embodiment of the disclosure, the control unit selects the usable channel with a minimum number of the competitive wireless access points to use together with the currently used first channel.

In an embodiment of the disclosure, when the wireless access points whose received signal strength indicator (RSSI) is less than a threshold, the wireless access points are not included in calculation of the number of the competitive wireless access points.

In an embodiment of the disclosure, the first communication protocol is a wireless wide area network communication protocol.

In an embodiment of the disclosure, the wireless wide area network communication protocol may be a worldwide interoperability for microwave access (WiMAX) standard, a $3^{rd}$ generation partnership project long term evolution, (3GPP LTE) standard or a 3GPP LTE-advanced standard.

In an embodiment of the disclosure, the second communication protocol is a wireless local area network communication protocol.

In an embodiment of the disclosure, the wireless local area network communication protocol may be a wireless fidelity (WiFi) standard or an 802.11 standard.

In an embodiment of the disclosure, the 802.11 standard may be an 802.11a standard, an 802.11b standard, an 802.11g standard or an 802.11n standard.

The disclosure provides a channel selection method, adapted to be executed by an electronic device, where the electronic device supports a first communication protocol and a second communication protocol, a band of the first communication protocol is divided into a plurality of first channels, and a band of the second communication protocol is divided into a plurality of second channels. The channel selection method includes following steps. When each of the first channels is used, a throughput of the second channels is measured and the number of wireless access points on each of the second channels is detected. The second channel simultaneously used together with the currently used first channel is selected from the second channels according to the throughput and the number of the wireless access points.

According to the above descriptions, according to the channel selection method of the disclosure, the interference between two communication protocols in the same electronic device is measured, and measured data is stored in the electronic device. The usable channels of the second communication protocol are selected according to the above data, and one of the usable channels is determined to use together with the currently used first channel according to the numbers of the wireless access points in the usable channels, so as to prevent or mitigate the interference between the two communication protocols to improve communication quality.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
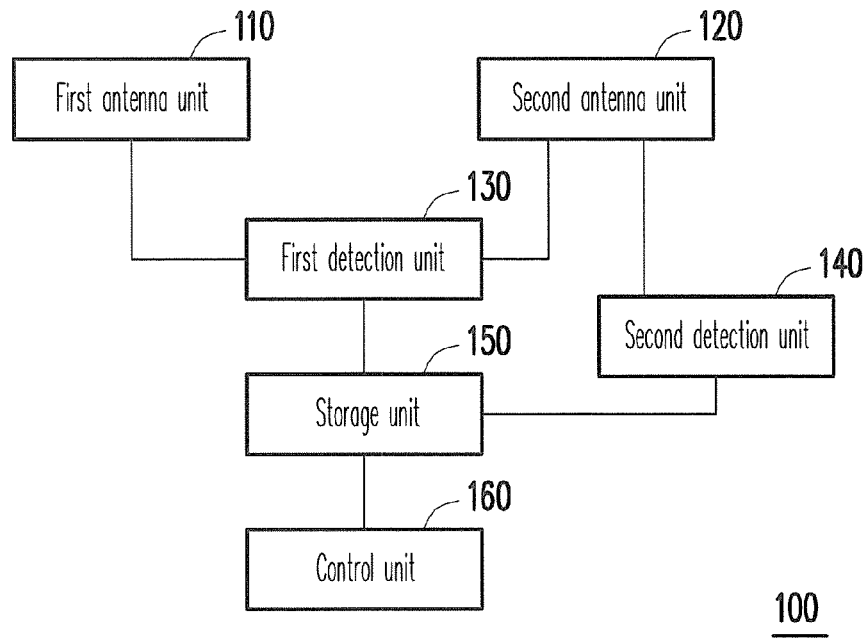
FIG. 1 is a functional block diagram of an electronic device according to an embodiment of the disclosure.
Figure 2:
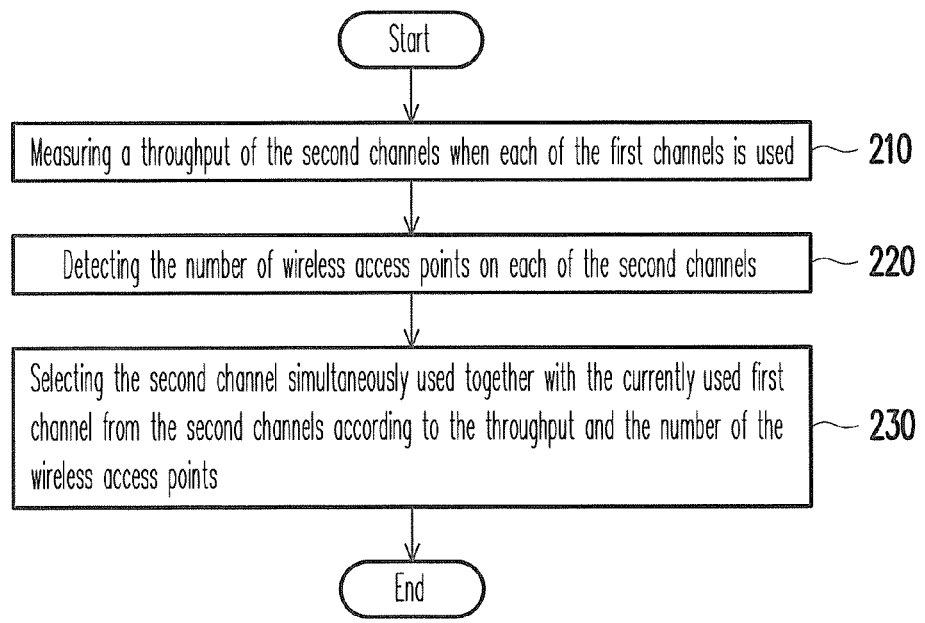
FIG. 2 is a flowchart illustrating a channel selection method according to an embodiment of the disclosure.

FIG. 1 is a functional block diagram of an electronic device according to an embodiment of the disclosure. FIG. 2 is a flowchart illustrating a channel selection method according to an embodiment of the disclosure. Referring to FIG. 1 and FIG. 2, the electronic device 100 uses the channel selection method of FIG. 2 for channel selection. The electronic device 100 may be a mobile phone, a personal digital assistant (PDA), a flat panel computer, a notebook computer, or a desktop computer, etc. As long as the electronic device supports a plurality of communication protocols, bands of the communication protocols are respectively divided into a plurality of channels, and the communication protocols are probably interfered due to the close bands, it is suitable for applying the channel selection method of the present embodiment. Moreover, the electronic device 100 may also be a hotspot communication device in the city, which supports two communication protocols. For example, a user may connect the hotspot communication device through a wireless fidelity (WiFi) communication protocol, and the hotspot communication device is connected to an Internet service provider (ISP) through a worldwide interoperability for microwave access (WiMAX) communication protocol. Therefore, the channel selection method of FIG. 2 is also suitable for the hotspot communication device.

Figure 3A:
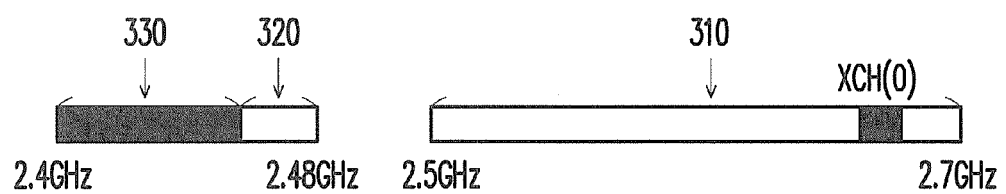
FIG. 3A and FIG. 3B are schematic diagrams illustrating interferences of communication channels according to an embodiment of the disclosure.
Figure 3B:
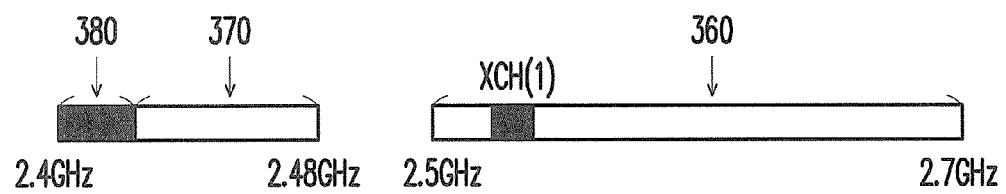

FIG. 3A and FIG. 3B are schematic diagrams illustrating interferences of communication channels according to an embodiment of the disclosure. The electronic device 100 of the present embodiment supports the WiFi communication protocol and the WiMAX communication protocol. A band of the WiFi communication protocol is 2.4 GHz-2.48 GHz, and a band of the WiMAX communication protocol is 2.5 GHz-2.7 GHz. A currently used WiMAX channel is determined by a WiMAX base station, though the electronic device may select a usable channel of the WiFi communication protocol. Each WiFi channel corresponds to a different frequency of the WiFi band, and each WiMAX channel corresponds to a different frequency of the WiMAX band.

As shown in FIG. 3A, a WiMAX band 310 is from 2.5 GHz to 2.7 GHz, and when a currently used WiMAX channel may be belonged to a middle band or a high band of the WiMAX band 310, for example, a channel XCH(0) is located at the high band area close to the 2.7 GHz. Now, in case that the interference of transceiving signals of the WiMAX communication protocol is avoided, the WiFi communication protocol may provide more usable channels for selection from the low band to the high band. On the other hand, channels located at a WiFi band 320 of FIG. 3A are probably interfered by the transceiving signals of the WiMAX communication protocol, and channels located at the WiFi band 330 may be those still maintaining throughputs to be greater than or equal to a minimum data transmission rate specified by the WiFi communication protocol.

Comparatively, as shown in FIG. 3B, a WiMAX band 360 is from 2.5 GHz to 2.7 GHz, and when a currently used WiMAX channel is belonged to a low band of the WiMAX band 360, for example, a channel XCH(1) is located close to the 2.5 GHz. Now, in case that the interference of transceiving signals of the WiMAX communication protocol is avoided, the WiFi communication protocol provides less usable channels for selection. In FIG. 3B, channels located at a WiFi band 370 are probably interfered by the transceiving signals of the WiMAX communication protocol, and channels located at the WiFi band 380 may be those still maintaining throughputs to be greater than or equal to the minimum data transmission rate specified by the WiFi communication protocol.

Figure 4A:
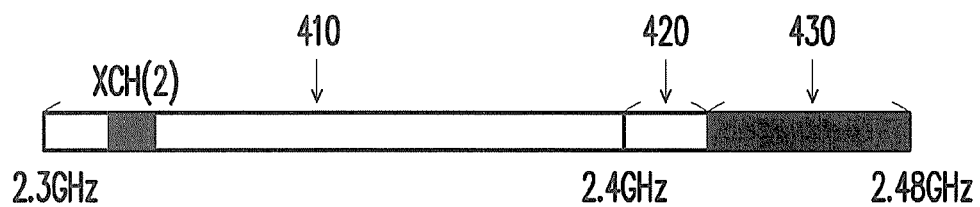
FIG. 4A and FIG. 4B are schematic diagrams illustrating interferences of communication channels according to another embodiment of the disclosure.
Figure 4B:
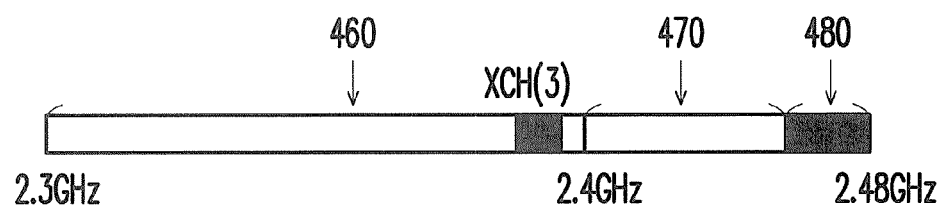

FIG. 4A and FIG. 4B are schematic diagrams illustrating interferences of communication channels according to another embodiment of the disclosure. A WiMAX band 410 is from 2.3 GHz to 2.4 GHz, and when a currently used WiMAX channel is belonged to a low band of the WiMAX band 410, for example, a channel XCH(2) is close to the 2.3 GHz. Now, in case that the interference of transceiving signals of the WiMAX communication protocol is avoided, the WiFi communication protocol may provide more usable channels for selection. In FIG. 4A, channels located at a WiFi band 420 are probably interfered by the transceiving signals of the WiMAX communication protocol, and channels located at the WiFi band 430 may be those still maintaining throughputs to be greater than or equal to the minimum data transmission rate specified by the WiFi communication protocol.

Comparatively, when a currently used WiMAX channel may be belonged to a middle band or a high band of the WiMAX band, for example, a channel XCH(3) is located close to the 2.4 GHz. Now, channels located at a WiFi band 470 are probably interfered by the transceiving signals of the WiMAX communication protocol, and channels located at the WiFi band 480 may be those still maintaining throughputs to be greater than or equal to the minimum data transmission rate specified by the WiFi communication protocol.

According to the above descriptions of the interferences of the communication channels of the two communication protocols (WiMAX and WiFi) in the same electronic device, the channel selection method and the electronic device of the disclosure are described in detail below.

Referring to FIG. 1 and FIG. 2, the electronic device 100 includes a first antenna unit 110, a second antenna unit 120, a first detection unit 130, a second detection unit 140, a storage unit 150 and a control unit 160. The first antenna unit 110 supports a first communication protocol, and a band of the first communication protocol is divided into a plurality of first channels. The second antenna unit 120 supports a second communication protocol, and a band of the second communication protocol is divided into a plurality of second channels.

The first detection unit 130 is coupled to the first antenna unit 110 and the second antenna unit 120, and the first detection unit 110 measures a throughput of each of the second channels when each of the first channels is used (step S210). The second detection unit 140 is coupled to the second antenna unit 120 for detecting the number of wireless access points on each of the second channels (step S220).

The storage unit 150 is coupled to the first detection unit 130 and the second detection unit 140 for providing a storage space to store the throughput of each of the second channels obtained when each of the first channels is used and the number of the wireless access points. The storage unit 150 in the electronic device 100 may be any type of storage device such as a floppy disk, a memory card or a hard disk, etc., which is not limited by the disclosure.

The control unit 160 is coupled to the storage unit 150 for selecting the second channel simultaneously used together with the currently used first channel from the second channels according to the throughput and the number of the wireless access points (step S230). A detailed implementation of the control unit 160 is that the control unit 160 uses the first antenna unit 110 to obtain a currently used first channel number, and determines at least one usable channel in the second channels according to the first channel number.

A definition of the usable channel may be that an interference degree between the usable channel and the first channel allows the throughput of the usable cannel to be greater than or equal to a stable transmission rate when the usable channel and the first channel are simultaneously used, where the stable transmission rate is a minimum data transmission rate specified by the second communication protocol. For example, in the present embodiment, the WiFi usable channels may be defined as channels still maintaining throughputs to be greater than or equal to the minimum data transmission rate specified by the WiFi communication protocol, which may be simultaneously used together with the currently used WiMAX channel and are not interfered by or slightly interfered by the WiMAX transceiving signals. The minimum data transmission rate specified by the WiFi communication protocol may be referred to as the stable transmission rate.

Moreover, a look-up table may be used to obtain the above usable channel. The control unit 160 establishes the look-up table according to each first channel number and the throughput of each of the second channels obtained when each of the first channels is used, where the look-up table records each of the second channels that is capable of being used together with the first channel when the first channel corresponding to each of the first channel numbers is used, and the control unit 160 stores the look-up table in the storage unit 150, and looks up the look-up table to obtain the usable channel from the second channels according to the first channel number.

Then, the control unit 160 selects the usable channel with a minimum number of the competitive wireless access points for using together with the currently used first channel according to the number of the competitive wireless access points in each of the usable channels. When a received signal strength indicator (RSSI) of a wireless access point is less than a threshold, such wireless access point is not included in calculation of the number of the competitive wireless access points.

In the present embodiment, the channel selection method is used in case that the WiMAX communication protocol and the WiFi communication protocol are simultaneously used, and implementation thereof is as follows. First, a WiMAX channel number is obtained from the first antenna unit 110, and then a corresponding WiFi usable channel is obtained according to the WiMAX channel number. In the look-up table, the number of the WiFi usable channels corresponding to each of the WiMAX channels may be probably more than one, and now the control unit 160 selects one of the WiFi usable channels for using together with the currently used WiMAX channel according to the number of the competitive wireless access points in each of the WiFi usable channels. In the present embodiment, the control unit 160 selects the WiFi usable channel with the minimum number of the competitive wireless access points.

After the corresponding WiFi usable channel is obtained according to the look-up table, the electronic device 100 obtains the number of the competitive wireless access points of each of the WiFi usable channels and RSSI information of each of the wireless access points. Regarding the wireless access points in the WiFi usable channels, when the RSSI of a wireless access point is less than a threshold (which is preset by the electronic device 100), such wireless access point is not included in calculation of the number of the competitive wireless access points, for example, in a certain WiFi usable channel, a plurality of wireless access points compete for a channel usage right, though the RSSI of one of the wireless access points is less than the threshold, and such wireless access point is not included in the number calculation. For example, as shown in a following table 1, there are 5 WiFi usable channels available for selection, and each of the usable channels has a corresponding number of the wireless access points, and the number of the wireless access points with the RSSI less than the threshold is deducted to obtain a filtered number of the wireless access points. After the wireless access points with weaker RSSI are filtered, the electronic device 100 selects the WiFi usable channel with the minimum number of the wireless access points for using together with the currently used WiMAX channel. For example, the WiFi usable channel of number 4 in the table 1 has the minimum filtered number of the wireless access points, so that the control unit 160 selects such channel for using together with the currently used WiMAX channel.

TABLE 1

| WiFi channel number | Number of wireless access points | Number of wireless access points with RSSI less than threshold | Filtered number of the wireless access points |
|---|---|---|---|
| 1 | 5 | 3 | 2 |
| 2 | 6 | 2 | 4 |
| 3 | 4 | 1 | 3 |
| 4 | 4 | 3 | 1 |
| 5 | 5 | 1 | 4 |

In summary, in the disclosure, the corresponding WiFi usable channel is found according to a transceiving signal power of each channel of the WiMAX communication protocol, and the corresponding measuring results are stored in the electronic device. Then, based on the measuring results, the electronic device determines the WiFi channel to be used according to the number of the competitive wireless access points in each WiFi usable channel. Different to the conventional solution that a fixed WiFi channel is used to avoid the interference, the channel selection method of the disclosure provides a plurality of WiFi usable channels for dynamic selection, so as to enhance the data transmission rate of the WiFi communication protocol. In this way, the electronic device may simultaneously use the WiFi and the WiMAX communication protocols, and may resolve the problem of mutual interference of the two communication protocols. Moreover, it should be noticed that the WiMAX band and the WiFi band specified in each nation are different, though the application of the present embodiment is not limited to the aforementioned WiMAX and WiFi band ranges.

Moreover, the electronic device of the present embodiment supports the WiFi and the WiMAX communication protocols, though the disclosure is not limited thereto, and the above two communication protocols may be replaced by other communication protocols with the same property, where the WiMAX communication protocol may be replaced by other types of wireless wide area network communication protocol, which is, for example, complied with a $3^{rd}$ generation partnership project long term evolution (3GPP LTE) standard or a 3GPP LTE-advanced standard. The WiFi communication protocol may be replaced by other types of wireless local area network communication protocol, which is, for example, complied with an institute of electrical and electronics engineers (IEEE) 802.11 standard, or a supplementary edition of the 802.11 standard, for example, an 802.11a standard, an 802.11b standard, an 802.11g standard or an 802.11n standard.

It will be apparent to those skilled in the art that various modifications and variations may be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electronic device, comprising:
   a first antenna unit, supporting a first communication protocol, wherein a band of the first communication protocol is divided into a plurality of first channels;
   a second antenna unit, supporting a second communication protocol, wherein a band of the second communication protocol is divided into a plurality of second channels;
   a first detection unit, coupled to the first antenna unit and the second antenna unit, and measuring a throughput of each of the second channels when each of the first channels is used;
   a second detection unit, coupled to the second antenna unit, and detecting a number of wireless access points on each of the second channels;
   a storage unit, coupled to the first detection unit and the second detection unit, and providing a storage space to store the throughput of each of the second channels obtained when each of the first channels is used and the number of the wireless access points; and
   a control unit, coupled to the storage unit, and selecting at least one second channel simultaneously used together with the first channel currently used from the second channels according to the throughput and the number of the wireless access points.

2. The electronic device as claimed in claim 1, wherein the control unit uses the first antenna unit to obtain a first channel number currently used, and determines at least one usable channel in the second channels according to the first channel number, wherein an interference degree between the usable channel and the first channel allows the throughput of the usable cannel to be greater than or equal to a stable transmission rate when the usable channel and the first channel are simultaneously used, and the control unit selects one of the usable channels to use together with the first channel currently used according to the number of the competitive wireless access points in each of the usable channels.

3. The electronic device as claimed in claim 2, wherein the stable transmission rate is a minimum data transmission rate specified by the second communication protocol.

4. The electronic device as claimed in claim 2, wherein the control unit establishes a look-up table according to each of the first channel numbers and the throughput of each of the second channels obtained when each of the first channels is used, wherein the look-up table records each of the second channels that is capable of being used together with the first channel when the first channel corresponding to each of the first channel numbers is used, and the control unit stores the look-up table in the storage unit, and looks up the look-up table to obtain the usable channel from the second channels according to the first channel number.

5. The electronic device as claimed in claim 2, wherein the control unit selects the usable channel with a minimum number of the competitive wireless access points to use together with the first channel currently used.

6. The electronic device as claimed in claim 5, wherein the wireless access points whose received signal strength indicator (RSSI) is less than a threshold, the wireless access points are not included in calculation of the number of the competitive wireless access points.

7. The electronic device as claimed in claim 1, wherein the first communication protocol is a wireless wide area network communication protocol.

8. The electronic device as claimed in claim 7, wherein the wireless wide area network communication protocol is a worldwide interoperability for microwave access (WiMAX) standard, a 3rd generation partnership project long term evolution, (3GPP LTE) standard or a 3GPP LTE-advanced standard.

9. The electronic device as claimed in claim 1, wherein the second communication protocol is a wireless local area network communication protocol.

10. The electronic device as claimed in claim 9, wherein the wireless local area network communication protocol is a wireless fidelity (WiFi) standard or an 802.11 standard.

11. The electronic device as claimed in claim 10, wherein the 802.11 standard is an 802.11a standard, an 802.11b standard, an 802.11g standard or an 802.11n standard.

12. A channel selection method, adapted to be executed by an electronic device, wherein the electronic device supports a first communication protocol and a second communication protocol, a band of the first communication protocol is divided into a plurality of first channels, and a band of the second communication protocol is divided into a plurality of second channels, the channel selection method comprising:
    measuring a throughput of the second channels when each of the first channels is used;
    detecting a number of wireless access points in each of the second channels; and
    selecting at least one second channel simultaneously used together with the first channel currently used from the second channels according to the throughput and the number of the wireless access points.

13. The channel selection method as claimed in claim 12, wherein the step of selecting the at least one second channel simultaneously used together with the currently used first channel from the second channels according to the throughput and the number of the wireless access points comprises:
    obtaining a first channel number currently used;
    determining at least one usable channel in the second channels according to the first channel number, wherein an interference degree between the usable channel and the first channel allows the throughput of the usable cannel to be greater than or equal to a stable transmission rate when the usable channel and the first channel are simultaneously used; and
    selecting one of the usable channels to use together with the first channel currently used according to the number of the competitive wireless access points in each of the usable channels.

14. The channel selection method as claimed in claim 13, wherein the stable transmission rate is a minimum data transmission rate specified by the second communication protocol.

15. The channel selection method as claimed in claim 13, further comprising:
    establishing a look-up table according to each of the first channel numbers and the throughput of each of the second channels obtained when each of the first channels is used, wherein the look-up table records each of the second channels that is capable of being used together with the first channel when the first channel corresponding to each of the first channel numbers is used; and
    obtaining the usable channel from the second channels in the look-up table according to the first channel number.

16. The channel selection method as claimed in claim 13, wherein the step of selecting one of the usable channels to use together with the currently used first channel comprises:
    selecting the usable channel with a minimum number of the competitive wireless access points to use together with the first channel currently used.

17. The channel selection method as claimed in claim 16, wherein the wireless access points whose received signal strength indicator (RSSI) is less than a threshold, the wireless access points are not included in calculation of the number of the competitive wireless access points.

18. The channel selection method as claimed in claim 12, wherein the first communication protocol is a wireless wide area network communication protocol.

19. The channel selection method as claimed in claim 18, wherein the wireless wide area network communication protocol is a worldwide interoperability for microwave access (WiMAX) standard, a 3rd generation partnership project long term evolution, (3GPP LTE) standard or a 3GPP LTE-advanced standard.

20. The channel selection method as claimed in claim 12, wherein the second communication protocol is a wireless local area network communication protocol.

21. The channel selection method as claimed in claim 20, wherein the wireless local area network communication protocol is a wireless fidelity (WiFi) standard or an 802.11 standard.

22. The channel selection method as claimed in claim 21, wherein the 802.11 standard is an 802.11a standard, an 802.11b standard, an 802.11g standard or an 802.11n standard.

* * * * *